United States Patent Office 3,318,942
Patented May 9, 1967

3,318,942
STABILIZED POLYMERIZABLE CARBONATE DI-
ISOCYANATE COMPOUNDS AND PROCESS FOR
EFFECTING STABILIZATION
Thomas K. Brotherton and John W. Lynn, Charleston,
W. Va., assignors to Union Carbide Corporation, a corporation of New York
No Drawing. Filed Nov. 14, 1963, Ser. No. 323,575
12 Claims. (Cl. 260—463)

This invention relates, in general, to stabilized polymerizable compounds. In one aspect, this invention relates to stabilized polymerizable carbonate diisocyanate compounds and to a process for effecting the stabilization.

A major problem attending the manufacture of carbonate diisocyanate compounds is the tendency for such compounds to undergo polymerization during refinement. This polymerization, which occurs slowly or not at all at low temperatures, is greatly accelerated at the elevated temperatures involved during refinement by distillation. The formation of any polymer is undesirable for several reasons: first there is a direct loss of the diisocyanate compound itself to the polymer, second, the contamination of the diisocyanate compound by its polymer may interfere with its use as a reactive monomer or as a chemical intermediate, third, the presence of a solid polymer in the diisocyanate compound can plug the reaction system, thus hindering the manufacturing process with costly delays, and fourth, polymerization during refinement of the diisocyanate compound by fractional distillation tends to cause further polymerization due to the increased kettle temperature required, especially during the final stages of distillation.

It is known that the polymerization of many isocyanate compounds, such as toluene diisocyanate may be easily controlled during storage at low or ambient temperatures by the use of conventional acylating or alkylating-type inhibitors, such as acid chlorides, diethyl sulfate, and the like. However, such inhibitors are relatively ineffective at the higher temperatures encountered in fractional distillation. Although the inhibitors of this invention, as hereinafter defined, are useful as stabilizers during storage, they are particularly useful in preventing polymer formation at the higher distillation temperatures encountered in purifying carbonate diisocyanate.

In the synthesis of carbonate diisocyanates from the corresponding carbonate diamine hydrochloride, as hereinafter disclosed, it was found that in many instances the crude diisocyanate, e.g., bis(2-isocyanatoethyl) carbonate, was thermally unstable and after heating at a temperature of about 150° C. a rapid exothermic polymerization occurred. Efforts to control polymerization during distillation of the crude diisocyanate product were rendered especially difficult for several reasons. For example, the known stabilizers for low temperature use were not satisfactory for high temperature distillation. Either the stabilizer volatilized at the distillation temperature, and hence provided little or no stabilization, or the stabilizer was of such composition as to be ineffective at the higher temperatures. Therefore, it was important to find a means of effectively stabilizing the diisocyanate compound during the refinement process, without the disadvantages attending the use of conventional techniques.

Accordingly, one or more of the following objects will be achieved by the practice of the instant invention. It is an object of this invention to provide stabilized polymerizable carbonate diisocyanate compounds, particularly the bis(omega-isocyanatealkyl) carbonate compounds. It is also an object of this invention to provide stabilized compositions of matter comprising polymerizable carbonate diisocyanate compounds wherein polymerization is retarded at temperatures as high as the boiling point of the polymerizable compound. A further object of the present invention is to provide stabilized polymerizable carbonate diisocyanate compounds which contain an effective stabilizing amount of certain aromatic sulfonyl chlorides. Another object of the present invention is to provide stabilized polymerizable carbonate diisocyanate compounds which contain an effective stabilizing amount of 1,5-naphthalenedisulfonyl chloride. A further object of the present invention is to provide a method of stabilizing polymerizable carbonate diisocyanate compounds by admixing with said compounds an effective stabilizing amount of certain aromatic sulfonyl chlorides. Another object of the present invention is to provide a method of stabilizing polymerizable carbonate diisocyanate compounds by admixing with said compounds an effective stabilizing amount of 1,5-naphthalenedisulfonyl chloride. These and other objects will readily become apparent to those skilled in the art in the light of the teachings herein set forth.

A broad aspect of this invention is directed to stabilized polymerizable carbonate diisocyanates which contain an effective stabilizing amount, sufficient to stabilize the diisocyanate compound, of a member selected from the class consisting of m-benzenedisulfonyl chloride and 1,5-naphthalenedisulfonyl chloride.

By the term "stabilizing amount" is meant that sufficient to effectively stabilize the carbonate diisocyanate compound from polymerization. This amount will usually vary from about 0.01 percent to about 10 percent by weight, or higher. Preferably, however, from about 0.1 percent to about 5 percent by weight, based on the weight of polymerizable carbonate diisocyanate compound to be stabilized, is added. Additionally the amount of stabilizer will vary depending upon the reactivity of the compound being stabilized, and as previously indicated all that is required is a stabilizing amount, sufficient to protect against polymerization.

The polymerizable carbonate diisocyanates which are inhibited against polymerization in accordance with the process of this invention include, among others, the carbonate diisocyanates represented by the formula:

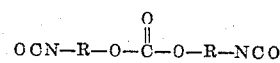

wherein R represents a member selected from the group consisting of divalent substituted and unsubstituted aliphatic, cycloaliphatic and aromatic groups. Preferred compounds which can be stabilized are those wherein R represents a divalent hydrocarbon radical containing from 2 to 12 carbon atoms. Particularly preferred compounds represented by the aforesaid formula are those wherein R represents a member selected from the group consisting of alkylene, alkenylene, alkynylene, arylene, arylenealkylene, alkylenearylene, alkarylene, aryleneal- kenylene, alkenylenearylene, arylenealkynylene, alkynyl- enearylene, cycloalkylene, cycloalkenylene, alkylcycloalkylene, alkylcycloalkenylene, cycloalkylenealkylene, cycloalkenylenealkylene, heterocyclylene, heterocyclylenealkylene, alkenyleneheterocyclylene, aryleneheterocyclylene, and heterocyclylenearylene group containing from 2 to 12 carbon atoms.

The following compounds illustrate aliphatic carbonate diisocyanates which can be stabilized in accordance with the teachings of the present invention:

bis(2-isocyanatoethyl) carbonate,
bis(3-isocyanatopropyl) carbonate,
bis(4-isocyanatobutyl) carbonate,
bis(5-isocyanatopentyl) carbonate,
bis(7-isocyanatoheptyl) carbonate,
bis(8-isocyanatooctyl) carbonate,
bis(9-isocyanatononyl) carbonate,
bis(10-isocyanatodecyl) carbonate,
bis(2-methyl-3-isocyanatopropyl) carbonate,
bis(2,2-dimethyl-3-isocyanatopropyl) carbonate,
bis(3-ethyl-5-isocyanatopentyl) carbonate,
bis(3,4-diethyl-5-isocyanatopentyl) carbonate,
bis(4,4-dimethyl-6-isocyanatohexyl) carbonate,
bis(2-methyl-4-ethyl-6-isocyanatohexyl) carbonate,
bis(9-isocyanatononyl) carbonate,
bis(5,6,7-triethyl-9-isocyanatononyl) carbonate,
2-isocyanatoethyl 3-isocyanatopropyl carbonate,
4-isocyanatobutyl 6-isocyanatohexyl carbonate,
3-isocyanatopropyl 8-isocyanatooctyl carbonate,
5-isocyanatopentyl 6-isocyanatohexyl carbonate,
2-methyl 3-isocyanatopropyl 2-isocyanatoethyl carbonate,
4-ethyl-7-isocyanatoheptyl 6-isocyanatohexyl carbonate,
bis(4-isocyanato-2-butenyl) carbonate,
bis(5-isocyanato-3-pentenyl) carbonate,
bis(7-isocyanato-4-heptenyl) carbonate,
bis(8-isocyanato-4-octenyl) carbonate,
bis(9-isocyanato-5-nonenyl) carbonate,
bis(10-isocyanato-6-decenyl) carbonate,
bis(3-ethyl-5-isocyanato-3-pentenyl) carbonate,
bis(3,4-dimethyl-5-isocyanato-3-pentenyl) carbonate,
bis(2-methyl-4-ethyl-6-isocyanato-3-hexenyl) carbonate,
bis(5,6,7-triethyl-9-isocyanato 6-nonenyl) carbonate,
4-isocyanato-2-butenyl 3-isocyanatopropyl carbonate,
4-isocyanato-2-butenyl 5-isocyanato-3-pentenyl carbonate,
4-ethyl-7-isocyanato-5-heptenyl 6-isocyanato-3-hexenyl carbonate,
bis(2-phenyl-3-isocyanatopropyl) carbonate,
bis(3-naphthyl-5-isocyanatopentyl) carbonate,
bis(3-styryl-5-isocyanatopentyl) carbonate,
bis(4-tolyl-6-isocyanatohexyl) carbonate,
bis(6-cumenyl-7-isocyanatoheptyl) carbonate,
bis(5-xylyl-8-isocyanatooctyl) carbonate,
bis(7-mesityl-9-isocyanatononyl) carbonate,
bis(2-cyclohexyl-3-isocyanatopropyl) carbonate,
bis(3-cyclohexyl-5-isocyanatopentyl) carbonate,
bis(4-cyclohexyl-6-isocyanatohexyl) carbonate,
bis(5-cyclohexylmethyl-7-isocyanatoheptyl) carbonate,
bis(3-cycloheptyl-5-isocyanatopentyl) carbonate,
bis(3-cyclohexenyl-5-isocyanatopentyl) carbonate,
bis(5-cycloheptenylmethyl-8-isocyanatooctyl) carbonate and the like.

Illustrative cycloaliphatic carbonate diisocyanates include, among others, the following:

bis(2-isocyanatocyclobutyl) carbonate,
bis(3-isocyanatocyclopentyl) carbonate,
bis(4-isocyanatocyclohexyl) carbonate,
bis(5-isocyanatocycloheptyl) carbonate,
bis(6-isocyanatocyclooctyl) carbonate,
bis(7-isocyanatocyclononyl) carbonate,
bis(3-isocyanato-4-cyclopentenyl) carbonate,
bis(4-isocyanato-5-cyclohexenyl) carbonate,
bis(2-isocyanatocyclobutylmethyl) carbonate,
bis(2-isocyanato-3-ethylcyclobutyl) carbonate,
bis(3-isocyanatoethyl-2-cyclobutyl) carbonate,
bis(3-isocyanatocyclopentylmethyl) carbonate,
bis(3-isocyanato-2-ethylcyclopentyl) carbonate,
bis(2-isocyanatoethyl-3-cyclopentyl) carbonate.

Typical aromatic carbonate diisocyanates include, among others, the following:

bis(4-isocyanatophenyl) carbonate,
bis(2-isocyanatophenyl) carbonate,
bis(3-isocyanatophenyl) carbonate,
bis(7-isocyanato-2-naphthyl) carbonate,
bis(7-isocyanato-1-naphthyl) carbonate,
bis(4'-isocyanato-4-biphenylyl) carbonate,
bis(5-isocyanato-2-idenyl) carbonate,
bis(4-isocyanatobenzyl) carbonate,
bis(4-isocyanatophenylethyl) carbonate,
bis(7-isocyanato-2-naphthylmethyl) carbonate,
bis[4(3'-isocyanatopropyl)phenyl] carbonate,
bis(4-isocyanatomethylphenyl) carbonate,
bis[2(3'-isocyanatopropyl)naphthyl] carbonate,
bis(4-isocyanato-2-methylphenyl) carbonate,
bis(6-isocyanato-2,4-xylyl) carbonate,
bis(4-isocyanato-3-cumenyl) carbonate,
bis(4-isocyanato-2-methoxyphenyl) carbonate,
bis(4-isocyanato-2-styryl) carbonate,
bis[4(3'-isocyanato-1-propenyl)phenyl] carbonate, and the like.

The carbonate diisocyanates stabilized by the process of this invention are novel compositions and can be produced in relatively high yields by the reaction of the corresponding carbonate diamine or carbonate diamine salt starting material, contained in an inert, normally liquid reaction medium with a carbonyl dihalide and thereafter recovering the diisocyanate product.

The starting materials for the production of the carbonate diisocyanates are the corresponding carbonate diamines or carbonate dimine salts which can be conveniently represented by the following general formula:

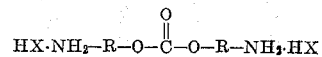

wherein R has the same value as previously indicated and HX represents hydrogen chlorides, hydrogen bromide, or mineral acids such as sulfuric, phosphoric and the like. Other acid salts can also be utilized but inasmuch as hydrochloric acid has a common anion with phosgene it is the preferred salt, both from this, as well as economic considerations.

The carbonate diamines, and their hydrohalides, such as bis(2-aminoethyl) carbonate, bis(2-aminoethyl) carbonate dihydrohalide, bis(4-aminophenyl) carbonate dihydrohalide and the like, can be conveniently prepared by sparging a carbonyl dihalide, such as phosgene, through a slurry of the hydroxy amine hydrohalide in an inert liquid reaction medium at a temperature of from about 65° to about 95° C. the carbonate diamine dihydrohalide is then isolated, as for example, by filtration and then washed and dried.

The bis(aminoaryl) carbonate dihydrohalides can be conveniently prepared by one or more alternate routes involving for example, the reaction of nitrophenol and phosgene to form a bis(nitrophenyl) carbonate, followed by reduction of the nitro groups to the corresponding amine groups. Treatment with a hydrogen halide completes the process to form the bis(aminophenyl) carbonate dihydrohalide.

In general, the conversion of the carbonate diamine or carbonate diamine salt to the carbonate diisocyanate is accomplished by sparging a carbonyl dihalide, more preferably phosgene, through a slurry of the carbonate diamine or the carbonate diamine dihydrohalide contained in an inert, normally liquid reaction medium at a temperature within the range of from about 100° to about 225° C., more preferably from about 125° to about 170° C., and thereafter recovering the carbonate diisocyanate.

In general, the liquid reaction medium employed in the conversion of the carbonate diamine or carbonate amine salt to the corresponding carbonate diisocyanates must be inert to the reactants and stable under the conditions employed. Moreover, it should be easily separable from the resulting carbonate diisocyanate. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymene, amylbenzene; cycloaliphatic hydrocarbons such as cyclohexane, heptylcyclopentane, decahydronaphthalene; the chlorinated aromatic hydrocarbons such as chlorobenzene, orthodichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobutyl ketone, methylhexyl ketone, diisopropyl ketone and other solvents such as tetramethylene sulfone, and the like.

Although reaction temperatures within the aforementioned range of from about 100° to about 225° C., have been found desirable for the preparation of the diisocyanates, temperatures above and below this range can also be utilized. However, from economic consideration the optimum yield and rate of reaction are usually attained within the aforesaid ranges. The particular temperature employed will be dependent in part upon the carbonate diamine or carbonate diamine salt starting material.

The optimum temperature for the conversion of the carbonate diamine to the carbonate diisocyanate is influenced, to a degree, by other reaction variables. For instance, in a batch type reactor with ortho-dichlorobenzene as the inert reaction medium, an amine hydrohalide concentration of 20–25 weight percent, based on the weight of the medium, and a phosgene feed rate of 0.5 to 1.0 mole per mole of amine hydrohalide per hour, the optimum temperature range is from about 125° C. to about 170° C. At temperatures below 125° C., the reaction times were too long to be practical, while temperatures above 170° C., the diisocyanate was, in part, converted to resinous materials. For optimum conversion, the concentration of carbonate diamine dihydrohalide in the reaction medium should be from about 2 to about 50 weight percent based on the weight of the medium.

Although the process for preparing the carbonate diisocyanates preferably is conducted with phosgene, in its broadest concept the process includes the utilization of any carbonyl dihalide such as carbonyl difluoride, or carbonyl dibromide. However, for economic considerations phosgene is the preferred carbonyl dihalide. In the preparation of the isocyanates phosgene can be used in either the gaseous or liquid form.

Inasmuch as the yield and rate of formation of the isocyanates are dependent upon several variables, for example, concentration of the amine, solubility of the amine and phosgene in the reaction medium, reaction temperature, pressure and rate of addition of the phosgene, no hard and fast rule can be devised regarding the optimum conditions to be employed.

In practice, it has been found that the mole ratio of phosgene to carbonate diamine dihydrohalide amine hydrochloride in the initial reaction medium preferably should be in excess of 3:1, although satisfactory results have been obtained at a lower ratio. When the phosgene subsequently is sparged into the reaction medium, feed rates of up to about 10 moles of phosgene per mole of amine per hour are preferred, although higher rates can equally as well be employed.

The following examples are illustrative:

EXAMPLE 1

*Preparation of bis(2-aminoethyl)carbonate dihydrochloride*

A mixture of 97 grams of 2-aminoethyl alcohol, hydrochloride (1.0 mole) and 244 grams of 1,2,4-trichlorobenzene was maintained at a temperature of 70–75° C. for a period of eight hours while gaseous phosgene was added at a rate of 49 cubic centimeters per minute. By-product hydrogen chloride and excess phosgene were evolved during the reaction. The resulting slurry was cooled, filtered, and the solid product edulcorated with 100 milliliters of dry methanol and dried. The dried product, 107 grams, represented a yield of 96.9 percent of the theoretical value, had a melting range of 191–196° C. and an infrared spectrum in agreement with that of the assigned structure. This material was composited with material obtained in a similar manner from other runs and the composite washed with methanol and dried. Upon analysis the compound has the following properties: Calculated for $C_5H_{14}Cl_2N_2O_3$: C, 27.15; H, 6.33; N, 12.66. Found: C, 27.32; H, 6.52; N, 12.37.

Infrared spectrum was in agreement with that of the assigned structure.

The carbonate diisocyanates which can be stabilized in accordance with teachings of this invention are an extremely attractive and useful class of compositions. These isocyanates are very reactive materials which condense with active hydrogen-containing materials such as alcohols and amines, to form carbamates, ureas, and the like.

EXAMPLE 2

*Preparation of bis(2-isocyanatoethyl) carbonate*

A slurry of 15 grams of bis(2-aminoethyl) carbonate dihydrochloride (0.068 mole) in 200 milliliters of toluene was maintained at reflux temperature while gaseous phosgene was sparged through the mixture for approximately six hours. 1,2,4-trichlorobenzene was then added to the reaction mixture and the phosgenation was continued for twelve hours with the reaction temperature being maintained at 125°–130° C. After cooling, the mixture was filtered and 8.0 grams of unreacted bis(2-aminoethyl) carbonate dihydrochloride was recovered. The solvents were removed by distillation yielding 12.0 grams of a residue product which represented a yield of 88.5 percent of the theoretical value. Distillation of the residue furnished a refined product with a boiling point of about 120° C. at a pressure of 0.1 millimeter of mercury and a Refractive Index, n 30/D, of 1.4600. Upon analysis the product had the following properties: Calculated for $C_7H_8N_2O_5$: C, 42.00; H, 4.00; N, 14.00. Found: C, 42.16; H, 4.97; N, 14.32. Infrared spectrum was in agreement with that of the assigned structure with absorption maxima at $4.42\mu$ (isocyanate —NCO); $5.74\mu$ (carbonate C=O); $7.94\mu$ (carbonate C—O).

A sample of the refined product was converted into a solid bisurea derivative by reaction with aniline. The derivative had a melting point of 163–165° C. and the following properties. Calculated for $C_{19}H_{22}N_4O_5$: C, 59.2; H, 5.71; N, 14.5. Found: C, 58.72; H, 5.61; N, 14.39. Infrared spectrum was in agreement with that of the assigned structure with absorption maxima at $3.02\mu$ (urea NH); $5.75\mu$ (Carbonate C=O); $6.07\mu$ (secondary amide C=O); $6.28\mu$, 6.68 (aromatic C=C); $6.45\mu$ (secondary amide NH); $8.15\mu$ (carbonate C—O); $13.25\mu$, $14.55\mu$ (monosubstituted aromatic ring).

EXAMPLES 3–15

In these examples the stabilizers of this invention were weighed into a dry glass tube which was filled with dry nitrogen. Thereafter bis(2-isocyanatoethyl) carbonate was added from a graduated syringe. The tubes were then sealed by means of cork stoppers and placed in a constant temperature bath of ±4° C. When the material became too viscous to flow at the temperature of the test it was assumed that polymerization had occurred.

For comparison purposes, the same experiment was carried out without the addition of any stabilizers and also with the addition of 0.5 percent by weight of known conventional stabilizers. The results obtained by the use of the conventional stabilizers are tabulated in Table I below with the results of the stabilizers employed in the instant invention.

TABLE I.—STABILIZATION OF BIS(?-ISOCYANATOETHYL) CARBONATE

| Example | Stabilizer | Concentration [1] | Temp., °C. | Time (hrs.) |
|---|---|---|---|---|
| 3 | None | | 170 | ¾ |
| 4 | m-Benzenedisulfonyl chloride | | 170 | 13 |
| 5 | Aluminum chloride | 0.5 | 170 | ¾ |
| 6 | Terephthaloyl chloride | 0.5 | 170 | ¾ |
| 7 | Benzyl chloride | 0.5 | 170 | ¾ |
| 8 | Hydroquinone, monomethyl ether | 0.5 | 170 | ¾ |
| 9 | Phosgene | 0.5 | 170 | ¾ |
| 10 | Diphenyl carbonate | 0.5 | 170 | ½ |
| 11 | 1,5-naphthalenedisulfonyl chloride | 0.5 | 170 | 8 |
| 12 | Dimethallyl 2,4-tolylenedicarbamate | 0.5 | 170 | ½ |
| 13 | Ditertiary dodecyl disulfide | 0.5 | 170 | ½ |
| 14 | n-Dodecyl carbonate | 0.5 | 170 | ½ |
| 15 | 1-fluoro-2,4-dinitrobenzene | 0.5 | 170 | 1 |

[1] In weight percent.

EXAMPLES 16–22

In order to demonstrate the stabilizing effect of the inhibitors of this invention at the higher temperatures, a comparison was made with an unstabilized sample at 100° C., 150° C., and 170° C. respectively. The results obtained are set forth in Table II below:

TABLE II.—STABILIZATION OF BIS(2-ISOCYANATOETHYL) CARBONATE EFFECT OF TEMPERATURE

| Example | Stabilizer | Concentration [1] | Temp., °C. | Time (hrs.) |
|---|---|---|---|---|
| 16 | m-Benzenedisulfonyl chloride | 0.5 | 170 | 13 |
| 17 | m-Benzenedisulfonyl chloride | 0.5 | 150 | 60 |
| 18 | 1,5-naphthalenedisulfonyl chloride | 0.5 | 170 | 8 |
| 19 | 1,5-naphthalenedisulfonyl chloride | 0.5 | 150 | 50 |
| 20 | None | 0.0 | 170 | 1 |
| 21 | do | 0.0 | 150 | 6 |
| 22 | do | 0.0 | 100 | 164 |

[1] In weight percent.

The unexpected improvements achieved are readily evident from the data presented.

Although the invention has been illustrated by the preceding examples, the invention is not to be construed as limited to the materials employed therein, but rather, the invention encompasses the generic invention as hereinbefore disclosed. Various modification and embodiments of this invention can be made without departing from the spirit and scope thereof.

What is claimed is:

1. A composition of matter consisting essentially of a polymerizable carbonate diisocyanate of the formula:

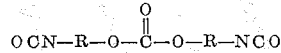

wherein R represents a divalent hydrocarbon radical of 2 to 12 carbon atoms and a stabilizing amount of an inhibitor selected from the group consisting of m-benzenedisulfonyl chloride and 1,5-naphthalenedisulfonyl chloride.

2. A composition of matter as claimed in claim 1 wherein said inhibitor is present in an amount of from about 0.01 to about 10 percent by weight of the carbonate diisocyanate.

3. A composition of matter consisting essentially of bis(omega-isocyanatoalkyl) carbonate, the alkyl moieties of which contain from 2 to 12 carbon atoms; and from about 0.01 to about 10 percent by weight, based on the weight of said carbonate, of 1,5-naphthalenedisulfonyl chloride.

4. A composition of matter consisting essentially of bis(2-isocyanatoethyl) carbonate and from about 0.01 to about 10 percent by weight, based on the weight of said carbonate, of 1,5-naphthalenedisulfonyl chloride.

5. A composition of matter consisting essentially of bis(omega-isocyanatoalkyl) carbonate, the alkyl moieties of which contain from 2 to 12 carbon atoms; and from about 0.01 to about 10 percent by weight, based on the weight of said carbonate, of m-benzenedisulfonyl chloride.

6. A composition of matter consisting essentially of bis(2-isocyanatoethyl) carbonate and from about 0.01 to about 10 percent by weight, based on the weight of said carbonate, of m-benzenedisulfonyl chloride.

7. A method of stabilizing a polymerizable carbonate diisocyanate of the formula:

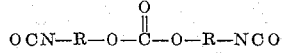

wherein R represents a divalent hydrocarbon radical of 2 to 12 carbon atoms which consisting essentially of admixing with said diisocyanate a stabilizing amount of an inhibitor selected from the group consisting of m-benzenedisulfonyl chloride and 1,5-naphthalenedisulfonyl chloride.

8. A method as claimed in claim 7 wherein said inhibitor is present in an amount of from about 0.01 to about 10 percent by weight of the carbonate diisocyanate.

9. A method of stabilizing bis(omega-isocyanatoalkyl) carbonate which consists essentially of admixing with said carbonate from about 0.01 to about 10 percent by weight, based on the weight of said carbonate, of 1,5-naphthalenedisulfonyl chloride.

10. A method of stabilizing bis(2-isocyanatoethyl) carbonate which consists essentially of admixing with said carbonate from about 0.01 to about 10 percent by weight, based on the weight of said carbonate of 1,5-naphthalenedisulfonyl chloride.

11. A method of stabilizing bis(omega-isocyanatoalkyl) carbonate, the alkyl moieties of which contain from 2 to 12 carbon atoms; which consists essentially of admixing with said carbonate from about 0.01 to about 10 percent by weight, based on the weight of said carbonate, of m-benzenedisulfonyl chloride.

12. A method of stabilizing bis(2-isocyanatoethyl) carbonate which consists essentially of admixing with said carbonate from about 0.01 to about 10 percent by weight, based on the weight of said carbonate of m-benzenedisulfonyl chloride.

No references cited.

CHARLES B. PARKER, *Primary Examiner.*

FLOYD D. HIGEL, *Assistant Examiner.*